Dec. 30, 1969    A. L. THOMPSON    3,487,360
EXTEND ABOVE CAR TOP LIGHT
Filed April 2, 1968
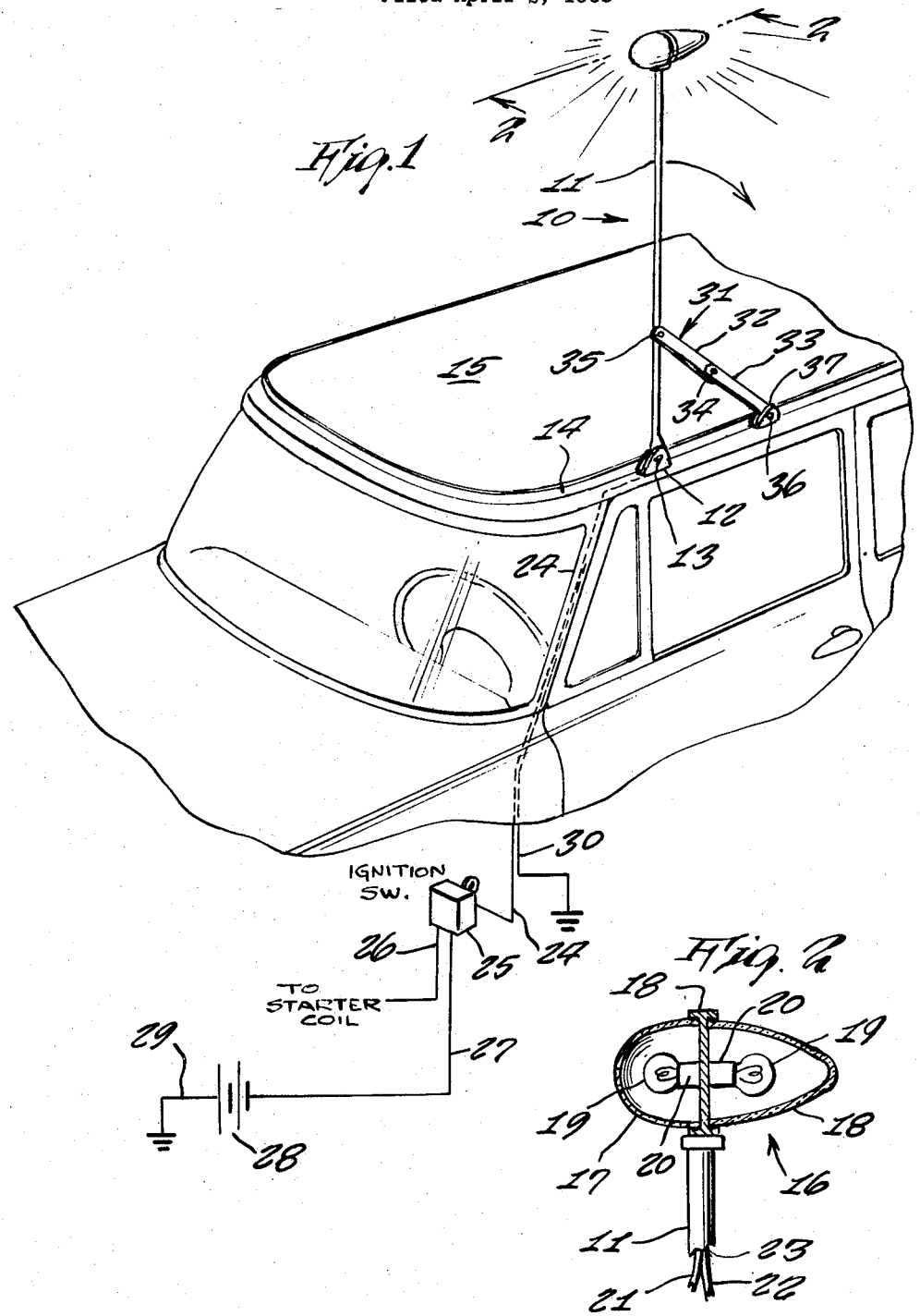
INVENTOR
ALVIN L. THOMPSON

3,487,360
EXTEND ABOVE CAR TOP LIGHT
Alvin L. Thompson, 411 W. 2nd St.,
Willmar, Minn. 56201
Filed Apr. 2, 1968, Ser. No. 718,132
Int. Cl. B60q 1/00
U.S. Cl. 340—87                                    1 Claim

ABSTRACT OF THE DISCLOSURE

A signal light for an automobile, the light comprising a lamp at the end of an upwardly pivotable post pivotable about a bracket in the drip rail groove, the light providing visibility of an approaching vehicle at an intersection where low objects hide the car from view to another approaching vehicle.

---

This invention relates generally to automobile signals.

It is generally well known that many accidents, collisions take place at intersections because one of the vehicles was not seen by the driver of the other vehicle. This situation occurs in particular where there are objects such as high fences, shrubbery or snow banks which completely hide an approaching vehicle to the driver of another vehicle approaching the intersection. This hazardous situation also occurs when cars back out of a driveway which is lined with tall shrubbery, fencing or the like thus not allowing a passing vehicle any knowledge of the car coming from the driveway. This is of course objectionable and in want of improvement.

Accordingly it is a principal object of the present invention to provide an automobile signal which is positioned sufficiently high above the vehicle so as to be clearly seen above low lying shrubbery, fences or the like which normally hide the vehicle.

Another object of the present invention is to provide an automobile signal which is readily collapsible into a retracted position when not in use.

Yet another object of the present invention is to provide an automobile signal which can be easily, manually pivoted into an upstanding position and located at a relatively great height above the vehicle body.

Yet another object of the present invention is to provide an automobile signal which may be otherwise used for readily locating an automobile in a crowded parking lot.

Other objects of the present invention are to provide an automobile signal which is simple in design, inexpensive to manufacture, rugged in construction, easy to use and efficient in operation.

These and other objects will be readily evident upon a study of the following specification and the accompanying drawing wherein:

FIGURE 1 is a perspective view of the present invention shown mounted upon the automotive vehicle and shown in operative position; and FIGURE 2 is an enlarged cross-sectional view thereof as viewed on line 2—2 of FIG. 1.

Referring now to the drawing in detail, the reference numeral 10 represents an automobile signal according to the present invention wherein there is a pole 11 that serves as an upright, one end of the pole being secured pivotally free by means of a pin 12 to a bracket 13 that is attachable to sit within a drip rail groove 14 of an automobile roof 15. The opposite end of the upright carries a lamp housing 16 comprised of a pair of domes 17 and 18 threadingly secured to a flat circular support 18 at the upper end of the upright 11.

A lamp 19 is mounted within a lamp socket 20 within each of the domes 17 and 18, the lamp sockets being electrically connected by means of electric cables 21 and 22 which extend through a central opening 23 through the upright 11, the cables extending out of the opposite end of the upright and being guided along the vehicle roof and down the windshield post 24 to an electric power source.

The two lamps 19 are in either series or parallel electrical circuit, the circuit including a connector 24 leading from the lamp to an ignition switch 25 which is manually controlled from the dashboard of the vehicle. A connector 26 extends from the ignition switch to a starting coil, not shown in the drawing. Another connector 27 extends from the ignition switch to the automobile battery 28, the battery being grounded as indicated by a connector 29. Another connector 30 communicates between ground and one contact of each of the lamps.

The upright is maintained in an upstanding position by means of a jack knife type brace 31 comprised of links 32 and 33 pivotally connected together by a pin 34, one of the links being connected by means of pin 35 to the upright 11, the other of the links being connected at its opposite end by a pin 36 to a bracket 37 also fitted in the drip rail 14. It will be noted that the brackets 12 and 37 may be positioned approximately 3 inches apart, and the pin 35 may be located also approximately 3 inches from the lower end of the upright. The brace 31 is of a characteristic wherein the links thereof override so that the brace will remain in a rigid position when the upright is in a vertical position.

In operative use, when it is desired to provide a signal so that the vehicle may enter a street from a driveway or used in areas where intersections do not afford ready visibility of approaching vehicles, the upright is then pivoted from a horizontal position adjacent the vehicle roof to an upstanding position as shown in FIG. 1 of the drawing. The driver may then turn on the ignition switch and be assured that the light provided from the upper end of the device will be readily seen by other motorists.

I claim:
1. For an automobile that has a power source and a vehicle roof having drip rails, an automobile signal comprising a longitudinal pole having a first end, a second end and a central opening therethrough, bracket means pivotally connected to the first end of the pole for attaching the pole to one of the drip rails and mounting the pole thereon, a jack-knife type brace comprising a pair of links having first ends pivotally connected and opposite ends, the opposite end of one link being pivotally connected to an intermediate portion of the pole, and second bracket means pivotally connected to the opposite end of the other link for attaching the link to the drip rail in spaced relationship to the first mentioned bracket means to permit the pole being pivotable between a horizontal position adjacent the roof and an upstanding position extending vertically above the roof, and lamp means mounted on the pole second end and adapted for connection to the automobile power source for providing an illuminated signal.

References Cited

UNITED STATES PATENTS

| | | | |
|---|---|---|---|
| 2,637,840 | 5/1953 | Heehler et al. | 340—50 X |
| 1,552,705 | 9/1925 | Johnson | 340—119 |
| 2,252,395 | 8/1941 | Cohen | 340—87 |
| 2,584,292 | 2/1952 | Rogers | 340—87 |
| 2,738,492 | 3/1956 | Arneson et al. | 340—87 |
| 3,375,365 | 3/1968 | Gross | 340—87 X |

JOHN W. CALDWELL, Primary Examiner

MICHAEL R. SLOBASKY, Assistant Examiner

U.S. Cl. X.R.

240—8.1; 340—50